United States Patent [19]

Schlegel, Jr.

[11] 3,813,159

[45] May 28, 1974

[54] PHOTO COMPOSING MACHINE AND METHOD FOR MAKING PLATES FROM MICROFILM

[75] Inventor: P. L. Schlegel, Jr., Whittier, Calif.

[73] Assignee: George Lithograph Company, San Francisco, Calif.

[22] Filed: Apr. 24, 1972

[21] Appl. No.: 246,805

[52] U.S. Cl............... 355/53, 355/54, 355/41, 355/63
[51] Int. Cl............... G03b 27/42, G03b 27/46
[58] Field of Search............ 355/53, 54, 41, 74, 62, 355/63, 61, 55, 86, 95; 95/12

[56] References Cited
UNITED STATES PATENTS

| 2,537,353 | 1/1951 | Kilminster | 355/86 |
| 3,052,174 | 9/1962 | Berger | 355/95 |
| 3,458,253 | 7/1969 | Hansen | 355/86 X |
| 3,586,437 | 6/1971 | Dietz et al. | 355/53 X |
| 3,591,282 | 7/1971 | Renold | 355/54 |
| 3,600,089 | 8/1971 | Walter | 355/41 X |
| 3,635,138 | 1/1972 | Mabry | 355/86 X |
| 3,639,059 | 2/1972 | Strumor et al. | 355/86 |
| 3,641,885 | 2/1972 | Hill | 95/12 X |
| 3,674,367 | 7/1972 | Chapman | 355/53 X |
| 3,716,296 | 2/1973 | Springer et al. | 355/86 X |

OTHER PUBLICATIONS

Chand, Step & Repeat Camera, 9-64, IBM Technical Disclosure Bulletin, Vol. 7, No. 4.

Primary Examiner—Robert P. Greiner
Attorney, Agent, or Firm—Julian Caplan

[57] ABSTRACT

A commercially available machine for making offset printing plates is controlled by digital data read from punched tape (or other medium) to move a vacuum board which holds the unexposed plate longitudinally and to move a chase transversely in steps. According to the present invention, the film holder conventionally used for platemaker use, located on the chase, is replaced by a photographic enlarger having a microfilm feeder preferably controlled to expose only certain frames. The feeder accurately centers selected frames relative to the axis of the lens of the enlarger, preferably using marks adjacent an edge of the film and one or more photocells which control the driving motor of the feeder. Several channels of marks may be used.

4 Claims, 7 Drawing Figures

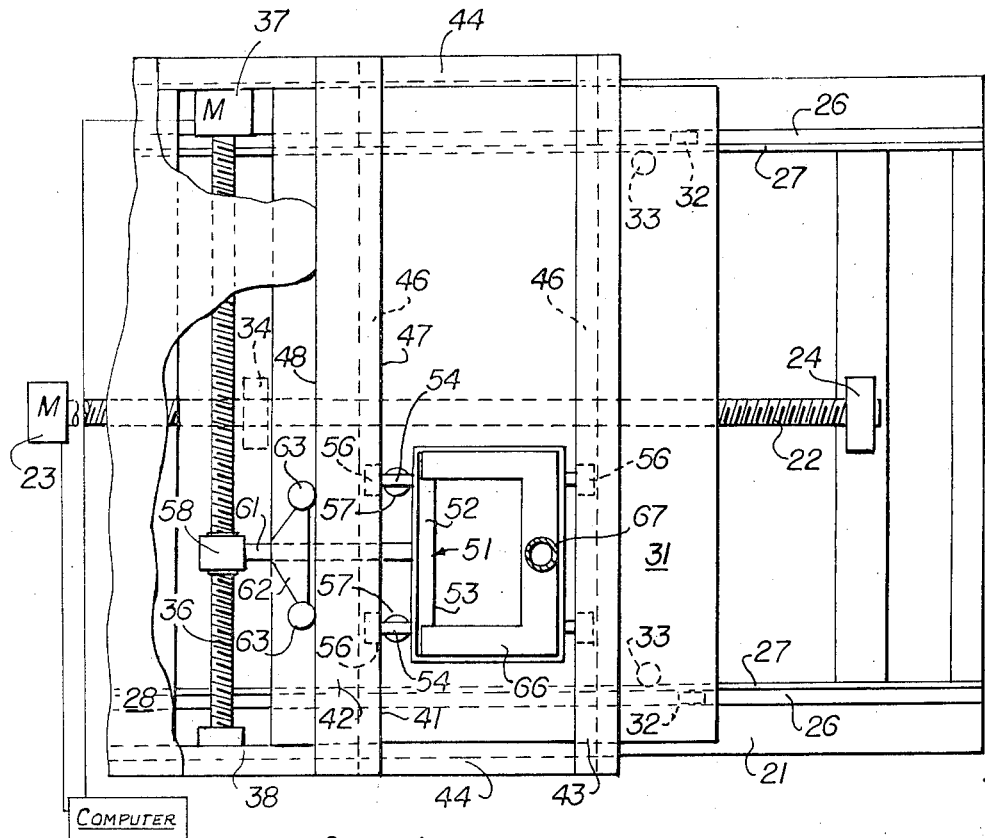

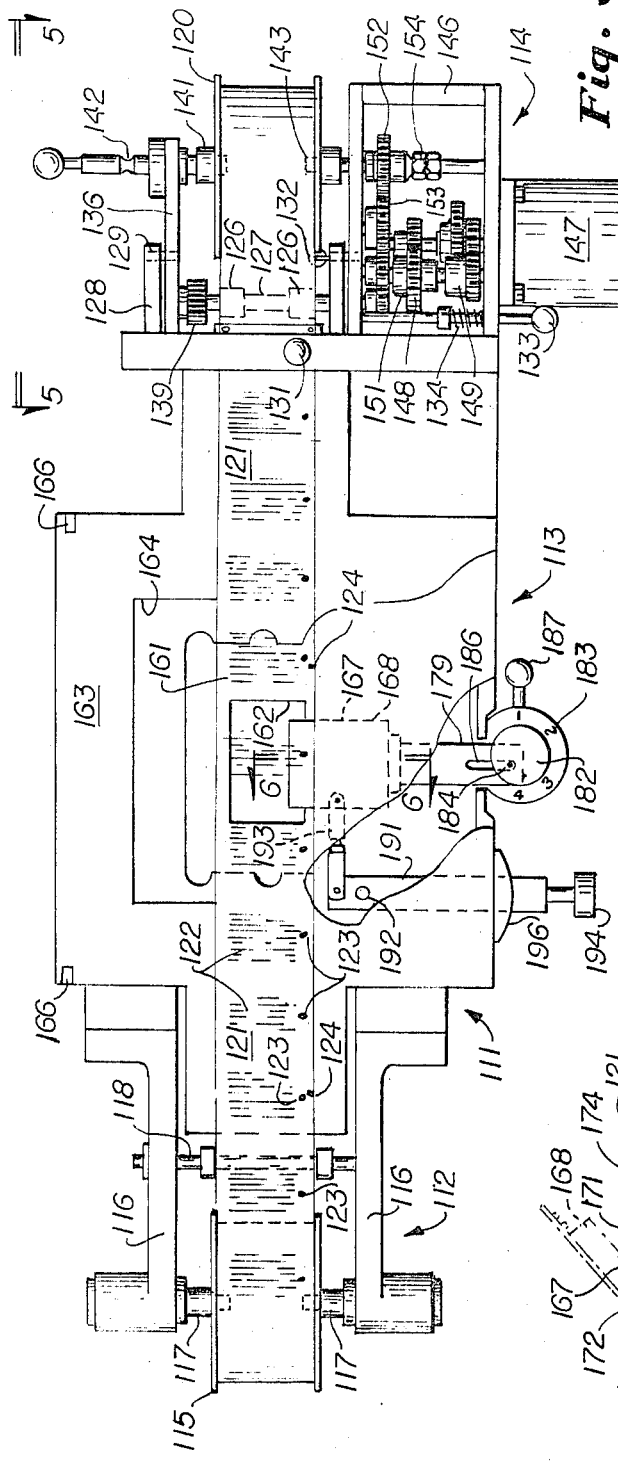

PHOTO COMPOSING MACHINE AND METHOD FOR MAKING PLATES FROM MICROFILM

This invention relates to a new and improved photo composing machine for making plates or print material or film from microfilm. More particularly, the invention relates to a machine which prints from microfilm directly onto large offset plates or film held on a vacuum table. The microfilm and table are movable longitudinally and transversely relative to each other. The invention adapts to a step and repeat plate maker enlarging and transport mechanisms for microfilm. Thus microfilm may be printed upon any suitable plate or film material.

Another feature of the invention is the fact that the chase on which the enlarger is located and vacuum table may be moved longitudinally and transversely while the microfilm is being moved and a microfilm frame may be printed in proper location for any required page size and in such relationship as to make possible the folding of the sheets printed from the plates into "signatures" for book binding purposes and/or collating.

More specifically, the images of the microfilm frames may be positioned in proper sequence in order to prepare signatures with the frame images exposed on the plate in proper sequence and in proper direction. Thus the sheets prepared from the plates may be folded, trimmed and stitched in normal fashion. On the other hand, if desired, the microfilm may be exposed on the plate material in the same sequence as the frames appear in the microfilm.

Another feature of the invention is that by precoding the microfilm an actuator used in connection with the microfilm transport senses the proper location of the film, advances the microfilm frame to the proper position, then stops and centers the frame and electrically initiates exposure of the properly located microfilm frame onto the plate, and then further initiates subsequent movement of the vacuum board and also of the microfilm.

A still further feature of the invention is the fact that two or more frames may be double printed onto one image on the vacuum table with extreme accuracy.

Another feature of the invention is the fact that it is possible to sequence the printing of the pages or to random print pages in proper position so as to make it possible to photo-compose signatures.

An object of the invention is to provide a method of preparing plates from which several pages are printed which comprises moving a selected frame of microfilm into position in an enlarger while simultaneously under control of a computer moving the enlarger and the holder for the plate so that the enlarger is directly over a proper position on the plate, then exposing the frame onto the plate or film and then moving both microfilm and plate or film to the next position in a sequence which insures that a sheet printed from the plate can be folded and trimmed into any appropriate signature suitable for binding.

Other objects of the present invention will become apparent upon reading the following specification and referring to the accompanying drawings in which similar characters of reference represent corresponding parts in each of the several views.

In the drawings:

FIG. 1 is a more or less schematic top plan view of the machine in accordance with the present invention partly broken away in section to reveal internal construction.

FIG. 2 is a fragmentary front elevational view of the structure of FIG. 1.

FIG. 3 is an enlarged top plan view through the microfilm transport partly broken away in section to reveal internal construction.

FIG. 4 is a front elevational view of a portion of the structure of FIG. 3.

FIG. 5 is a fragmentary elevational view taken substantially along the line 5—5 of FIG. 3.

FIG. 6 is a fragmentary sectional view taken substantially along the line 6—6 of FIG. 3.

FIG. 7 is a fragmentary top plan of the structure of FIG. 2 taken as shown by the line 7—7.

The present invention is an adaptation of an automatic, tape controlled step and repeat printer, Model DSP25A known as the "Superstep" manufactured by Dainippon Screen Manufacturing Co. Ltd. of Kyoto, Japan. Such a machine has a base 21 in which is mounted a longitudinally extending lead screw 22 which is driven by a reversible electric motor 23 at one end and is mounted in a suitable bearing 24 at the other end. Base 21 is formed with accurate vertical support tracks 26 and horizontal alignment tracks 27.

Movable longitudinally of base 21 is a vacuum table 31 which receives plate material or other sensitive print material and by vacuum (the details of the mechanism for drawing which are not shown) holds the material in place. The underside of table 31 has at each corner vertical support rollers 32 which roll in tracks 26 and also horizontal alignment rollers 33 which fit against the tracks 37. The underside of table 31 also has a nut 34 which is in threaded engagement with screw 22. As the screw 22 is turned in either direction by motor 23, the vacuum table 31 moves horizontally longitudinally.

Also mounted in base 21 above screw 22 is a transverse screw 36 which is driven by motor 37 and its opposite end is supported by bearing 38.

Base 21 is formed with an opening 41 which is defined by horizontal, transverse inner rail 42 and outer rail 43, the rails being interconnected by horizontal, transverse connectors 44. The inward facing edges of rails 42, 43 are formed with vertical support grooves 46 and the inner facing surface of inner rail 42 is formed with track 47 and the outer face with track 48.

Horizontally, transversely reciprocating in opening 41 is chase 51 which has a rectangular frame 52 formed with opening 53. Extending from the corners of chase 51 are support arms 54, each of which has a roller 56 which slides in grooves 46. The left-hand arms 54 are also provided with vertical axis rollers 57 which engage track 47. Nut 58 is in threaded engagement with screw 56 and is located on the end of chase drive arm 61, the opposite end of which is fixed to chase 51. Mounted on arm 61 is a stabilizer 62 having two rollers 63 which engage track 48 and cooperate with rollers 54 in guiding the horizontal movement of chase 51. As motor 37 turns in either direction, the chase 51 moves horizontally transversely.

By means forming no part of the present invention but which is inherent in the operation of the "Superstep" machine, a punched tape or otherwise controlled computer mechanism controls the operation of motors 23 and 37. A plate material which is held in position on table 31 may be exposed by means of an enlarger 64, hereinafter described in detail and mounted for movement on chase 51. It is common practice in the production of books to print a plurality of pages on a single sheet of material by means of an offset plate or other production means and the sheet is folded several times in several directions to form a "signature" which is used to make up a completed book. In such construction, consecutive pages of the book are not necessarily, or even usually, in consecutive locations on the plate. The copy from which each page is photographically exposed is derived in accordance with the present invention from frames of microfilm. The enlarger 64 moves with the chase 51 horizontally transversely and the vacuum board moves horizontally longitudinally under the controls of motors 37 and 23. By punched tape, the turning in opposite directions of motors 23 and 37 is controlled so that the chase 51 is directly over preselected positions on the plate held on the table 31. Sometimes two or more frames are exposed on the same page and the superposition of the two frames is also controlled by the tape which controls the motors 23 and 37 and microfilm transport motor 147.

It is a feature of the present invention that the microfilm is transported so that the proper microfilm frame is in position in the enlarger 64 at the precise time that the chase 51 is in proper position over the plate.

Enlarger 64 has a base 66 which is preferably U-shaped and fits around three of the four sides of the chase 51. Extending up from the base 66 is a stanchion 67 on which the enlarging head 69 is vertically adjustably movable and held in position by height adjusting screw 68. Head 69 contains a lamp 71 which is caused to illuminate the individual frames of the microfilm which are focused by lens 72 upon the plate which is held by vacuum on the table 31. One suitable enlarger 64 is illustrated and described herein. It will be understood that other microfilm transports and enlargers may be substituted.

At the left end of transport frame 111, as viewed in FIG. 3, is an input film support section 112, at the middle is an exposure section 113, and at the right is takeup section 114. The film moves from an input reel 115 mounted in section 112 through exposure section 113 to a takeup reel 120 on section 114.

Directing attention first to the input film support section 112, a pair of arms 116 extend to the left and have reel engaging spindles 117 which engage the input film reel 115 in a manner well understood in this art. The film from reel 115 is guided by one or more rotary film guides 118 which are spaced to accommodate the width of the film 121 which is being handled. Film 121, as best shown in FIG. 3, has a plurality of spaced frames 122 of alphanumeric and/or graphic material. The film 121 may, or may not, have sprocket holes. In the form shown herein, no sprocket holes are illustrated but it will be understood that the present equipment operates satisfactorily with sprocket-hole type film. Adjacent one or both marginal edges of film 121 opposite the middle of each frame 122 is at least one locating spot 123. When spot 123 is accurately located relative to the exposure head of enlarger 71, frame 122 is centered relative to the optical axis of the lens 72. One of the features of the present invention is that additional spots 124 may be located laterally and/or longitudinally of spot 123. For example, there may be four channels of spots. Further, there may be some channels on one side and other channels on the opposite side. It will be understood that the spots may be staggered. In other words, a spot 123 may be located opposite one of the frames 122 but not opposite other frames and the next innermost channel of spots may be blank opposite certain frames and positioned opposite other frames. The transport control will sense spots in selected channels and disregard spots in other channels, and hence certain frames 122 may be selected for exposure and other frames not exposed depending upon the positioning of spots 123, 124. Binary control digital electronics as well understood in that art may be used to select one individual frame from a larger plurality of frames depending upon the number of channels of spots used.

Directing attention now to the output film support section 114, upper film rollers 126 engage the top of film 121 and are rotated by transverse horizontal upper shaft 127 which is rotatably mounted in yoke 128. Yoke 128 is supported on horizontal axis pivot 129 by gearbox 146 and arm 136. Lift lever 131 attached to yoke 128 is used to pivot yoke 128 clockwise as viewed in FIG. 4 about its pivot axis 129. Spring 132 biases yoke 128 counterclockwise. When it is necessary to change film, the lift lever 131 is pivoted to the left as viewed in FIG. 5 so as to release pressure of the rollers 126 on the film. A horizontal slidable latch 133 mounted in the upper film support section 114 is biased by spring 134 to engage yoke 128 and to hold the yoke in operative position and latch 133 is retracted when lever 131 is lifted.

A longitudinal horizontal extending arm 136 is mounted on the back of section 114. A lower shaft 137 is rotatably mounted in arm 136 and in the casing of gearbox 146 and carries lower film rollers 138 which correspond in spacing to the rollers 126. The film 121 is thus gripped between the rollers 126 and 138. Gears 139 on shafts 127, 137 drive the shafts in opposite directions at the same speed.

Mounted on the outer end of arm 136 is takeup spindle 141 which cooperates with spindle 143 to support takeup reel 120. Retractor 142 is used to retract spindle 141 when it is necessary to remove the takeup reel, whereas spindle 143 on the gearbox 146 is non-retractable.

Gearbox 146 has mounted on the exterior thereof reversible motor 147. The shaft of motor 147 extends inside the gearbox 146 and a plurality of gears 148 are mounted within the box 146, said gears accomplishing a speed reduction between the shaft of motor 147 and the shaft 137. One direction clutches 149, 151 are mounted on some of the shafts supporting the gears within gearbox 146. As hereinafter appears, the motor 147 is driven by its electronic control in either of two directions. In one direction of rotation, the gear ratio is such that the shaft 137 is driven at relatively high speed. When the motor 147 is reversed in direction, the clutches 149, 151 disengage and the gears in box 146 accomplish speed reduction. Spindle 143 is mounted on a shaft which also carries takeup gear 152 which meshes with an idler 153 which engages one of the gears driving shaft 137. A slip clutch 154 biases gear 152 to turn with spindle 143 but permits slippage. Such a slip clutch arrangement is conventional in takeup reels where the varying amount of film on a takeup reel requires rotation of the reel at different speeds.

Directing attention now to the exposure section 113, a light-proof lower holder 161 is provided formed with an aperture 162 which is slightly larger than the size of a frame 122 to be exposed. Hinged to the lower holder 161 is an upper holder 163 which also has an aperture 164 which may be considerably larger than the aperture 162. Film 121 passes between holders 161 and 163 in conventional guides and the control of this invention has as its primary purpose to stop a selected frame 122 in registry with aperture 162 for exposure from a light source 171. Hinges 166 mount the upper holder 163 on the lower holder 161 in a manner to permit detachment of the upper holder when required and convenient opening of the holder when film is being changed.

Lamp holder 167 is fixed to the top side of holder 161 with its inner end over the path of travel of film 121. In registry with holder 167 is photocell carrier 171 hinged thereto by means of hinge 172, which has an axis which is horizontal and parallel to the direction of movement of the film. There are two or more photocells 173, 174 in carrier 171, for a purpose which hereinafter appears.

Lamp holder 167 has a plurality of lamp carriers 176 carrying lamps 177 which illuminate the edge of film 121 through apertures 178 and is in other respects light proof. The assembly of lamp carrier 176 and photocell carrier 171 is mounted on a slide 179 which slides transversely, horizontally in a guide 181 which is formed in lower holder 161. A round eccentric 182 is rotatable within an eccentric housing 183 on the side of the machine and the eccentric 182 carries a connector 184 which extends into a slot 186 in slide 179. Handle 187 is used to turn eccentric 182 within its housing 183 and as the handle is turned, the slide is pushed inward and outward. Numbers are enscribed on the housing 183 as best shown in FIG. 3, and when the handle 187 is placed opposite one of these numbers, the photocells 183, 184 are positioned in registry with one of the channels of the microfilm spots 123, 124.

Lamp carrier 176 is linked to a lever 191 which pivots about a vertical pivot 192. The end of lever 191 is connected by an adjustable link 193 to lamp carrier 176. The lever 191 extends exteriorly of the machine and has a handle 194 which engages the arcuate guide 196 mounted on the side of lower holder 161. By means of handle 194, the lever 191 may be locked in position on guide 196. Movement of lever 191 about pivot point 192 advances or retards the timing of the machine by affecting the position of the aperture 178 relative to aperture 162.

In use of the enlarger 64, a reel 115 of microfilm 121 or other film is mounted on spindles 116 and threaded through the machine to a takeup reel 120 mounted on spindles 141, 143 by lifting the upper holder 163 about its hinge 166 and also by lifting handle 131 to permit separation of the rollers 126, 138.

The handle 187 is then turned to the particular channel of spots which is to be sensed. By electrical means the motor 147 is started in fast speed direction and this causes the spindle 143 to turn the takeup reel rapidly and thus to feed the film 121 from left to right as viewed in FIG. 3. When the light from lamp 177 passing through apertures 178 is obstructed by one of spots 123 on film 121 (or one of the additional spots 124 depending upon the selected channel arising from location of handle 187) one of the photocells 173 is affected thereby and an electrical circuit causes the motor 147 to stop and to reverse. Reversal of motor 147 by reason of the presence of clutches 149, 151 causes a slot speed movement of film 121. When the photocell 173, which is accurately centered relative to aperture 162 senses the particular spot, the motor 147 is stopped. By this time computer controlled motors 23, 37 have moved enlarger 64 to the proper location above table 31. The digital input to the computer has defined the proper location. Thereupon by timing means exposure lamp 171 is illuminated or a shutter therefor is opened for a preselected period of time exposing the frame 122 through aperture 162 onto the plate on vacuum table 31.

When it is necessary to adjust the positioning of the image because of inaccurate positioning of the frame 122, handle 194 may be moved about the arcuate guide 196 to affect the longitudinal position of the photocells 173, 174.

A demand switch controlled by the tape control for motors 123, 137 starts motor 147 in one direction and thus drive film roll 138 at fast speed. It also initiates computer control of motors 23, 37 to move the plate to the next position. When a spot 123 activates cell 173, the fast speed motor control is disabled and the slow speed control causes motor 147 to reverse and to drive roll 138 at slow speed. When a spot 123 activates cell 174, motor 147 is stopped. When film, head and plate have all stopped, a signal is given to expose the frame. This exposes the plate on table 31.

It will be understood that instead of conventional silver film other materials such as diazo, thermo and other vesicular films may be used. Additionally, besides electrostatic plate and print production, the machine may be used in connection with exposure of other products. Typical examples are diazo-sensitized printing plates, photo-polymer printing plates, bichromatic and silver-sensitized plates of paper, metal and plastic and electrostatically charged paper, wood and plastic, all either precoated or uncoated. Also the machine may be used to expose photo-sensitive films such as silver film, silver coated paper, silver-coated plate materials and other types of plates. Metal plates, which are later etched or otherwise processed may be produced. Printed circuit boards and micro-circuit devices may be produced. When the work "film" is used in the accompanying claims it will be understood that the term is intended to have a broad meaning as above defined and, further, that the machine may be used for purposes other than manufacture of plates and prints.

It will be understood that the motor 147 drives the microfilm while the motors 23, 37 are positioning the enlarger 64 relative to the plate material held on vacuum table 31. The movement of the microfilm and of the vacuum table and of the chase are accurately programmed so that the proper frame of microfilm will be exposed in the proper position on the plate.

Multiple photocells may also be used to eliminate the mechanical movement described herein. The combination of spots may be used as binary bits to form hexadecimal digits. Further, the drive of the film may be made reversible — duplicating the motor drive on opposite sides with means for disengaging one motor and the other alternately. The device may then drive the film first in one direction and then the other, "hunting" until the proper spots are "read" by the photocells in the exposure section, whereupon the desired frame is exposed. As a further alternate, the film may be removed from reels 115, 120 and spliced into a continuous loop and the motor driven in one direction until the proper spots are read.

In some cases, in making up a plate for multiple-page printing, certain pages are turned 180° from others so that when the sheet is folded into pages the pages are all turned in the same direction. The head 64 may be mounted relative to column 67 so that it can be rotated 180°.

What is claimed is:

1. A machine for making plate material for printing one side of a book signature from microfilm wherein selected microfilm frames are exposed onto preselected positions on said material large enough to receive a plurality of exposures of said frames, said microfilm having marginal spots opposite at least certain frames, comprising a base, a rectangular vacuum table, a chase having a rectangular opening of substantially lesser area than said table, first support means for supporting said table for longitudinal movement relative to said base, first drive means for moving said table relative to said base along a first axis parallel to said base, second support means for supporting said chase for transverse movement relative to said table, second drive means independent of said first drive means for moving said chase in infinite gradations relative to said table along a second axis transverse to said first axis and parallel to said base, a vertical support extending upward from and movable with said chase, an enlarger vertically movably mounted on said support above said opening along a third axis transverse to said first and second axes and to said base and having an enlarger lamp, a lens and a microfilm transport between said lamp and lens whereby frames of microfilm are moved into position for exposure by said lamp and focused by said lens onto materials on said table, said transport comprising a transport frame having an exposure section having an aperture aligned with said opening, said lamp and said lens, a film support section supporting microfilm on one side of said exposure section, a film takeup section on the side of said exposure section opposite said one section and having film rollers for driving film from said support section and past said aperture in said exposure section, a reversible motor for driving said film rollers, and electrical means for controlling said motor to move said microfilm and locate a frame of microfilm at said aperture, said machine exposing on said table images of said frames, each image being of a size up to the size of said opening, said machine being capable of exposing a plurality of said images upon a plate held on said table to make up a pattern on said plate to print one side of a book signature, a light at said exposure section positioned to direct light through the margin of said microfilm, a photocell sensitive to light from said light and positioned to be affected by one of said spots, said photocell comprising a portion of said electrical means and said electrical means stopping said motor when said frame is centered relative to said aperture, a gear train and one-way clutches between said motor and said film rollers, a second light and a second photocell receiving light from said second light unless obstructed by one of said spots, said second photocell comprising a portion of said electrical means and said electrical means slowing said film rollers as said frame approaches the center of said aperture.

2. A machine, according to claim 1, in which said electrical means includes means for activating and deactivating said first and second drive means and said motor at the same time and for energizing said lamp only when said first and second drive means and said motor are deactivated.

3. A machine according to claim 1, wherein said microfilm has channels of spots in different positions and means for reading spots only in one or more selected channel of spots.

4. A machine according to claim 2 which further comprises a digitally controlled system arranged to control said first and second drive means to bring selected areas of said table under said opening in sequence, said electrical means moving said microfilm in timed sequence to movement of said table and chase and then to illuminate said exposure lamp to print a selected microfilm frame on material at a selected area of said table.

* * * * *